US012591597B1

(12) United States Patent
Cambronero et al.

(10) Patent No.: US 12,591,597 B1
(45) Date of Patent: Mar. 31, 2026

(54) METHOD AND SYSTEM OF CHANGING DATASET USED TO CHARACTERIZE INFORMATION

(71) Applicant: APPLETON GRP LLC, Rosemont, IL (US)

(72) Inventors: Earl Max Quisote Cambronero, Pasig (PH); Catherine Nicole Mancenido Ladisla, Pasig (PH); John Allen Hendrix, Jr., Rosemont, IL (US); Neil Jingo Samson Valmonte, Mandaluyong (PH); Dan Kenneth Cesler Royo, Mandaluyong (PH)

(73) Assignee: APPLETON GRP LLC, Rosemont, IL (US)

( * ) Notice: Subject to any disclaimer, the term of this patent is extended or adjusted under 35 U.S.C. 154(b) by 0 days.

(21) Appl. No.: 18/900,040

(22) Filed: Sep. 27, 2024

(51) Int. Cl.
*G06F 7/00* (2006.01)
*G06F 16/28* (2019.01)

(52) U.S. Cl.
CPC .................................. *G06F 16/285* (2019.01)

(58) Field of Classification Search
CPC ...................................................... G06F 16/285
USPC ................................................. 707/600–899
See application file for complete search history.

(56) References Cited

U.S. PATENT DOCUMENTS

| | | | |
|---|---|---|---|
| 6,408,422 | B1 | 6/2002 | Hwang et al. |
| 7,424,327 | B2 | 9/2008 | Grgic et al. |
| 8,484,474 | B2 | 7/2013 | Batke et al. |
| 8,924,778 | B2 | 12/2014 | Flynn et al. |
| 9,027,014 | B2 | 5/2015 | Asselin et al. |
| 10,042,335 | B2 | 8/2018 | Grgic |
| 10,241,803 | B2 | 3/2019 | Peng et al. |
| 10,756,974 | B2 | 8/2020 | Malaspina et al. |
| 11,131,986 | B1 | 9/2021 | Gal et al. |
| 11,526,343 | B2 | 12/2022 | Rajbharti et al. |
| 11,593,088 | B2 | 2/2023 | Duerksen et al. |
| 11,604,777 | B1 * | 3/2023 | Fritz ......................... G06N 5/01 |
| 11,816,465 | B2 | 11/2023 | Koval et al. |
| 11,868,752 | B2 | 1/2024 | Malaspina et al. |
| 2013/0304882 | A1 | 11/2013 | Shepherd et al. |
| 2018/0357058 | A1 | 12/2018 | Malaspina et al. |
| 2024/0085889 | A1 | 3/2024 | Mazur et al. |

FOREIGN PATENT DOCUMENTS

| | | |
|---|---|---|
| WO | 2021/005530 A1 | 1/2021 |

* cited by examiner

*Primary Examiner* — Isaac M Woo
(74) *Attorney, Agent, or Firm* — McDonnell Boehnen Hulbert & Berghoff LLP

(57) ABSTRACT

Examples include a first device. The first device includes a processor and a computer readable medium storing instructions that, when executed by the processor, cause the first device to perform functions. The functions include receiving a command to use a first dataset to characterize information instead of a second dataset. The first dataset associates an index with a first information category and the second dataset associates the index with a second information category. The functions further include writing an indicator of the first dataset to the computer readable medium in response to receiving the command, and receiving, from a second device, a request for data corresponding to the index. The functions further include sending, to the second device, the data that corresponds to the index according to the first dataset.

20 Claims, 5 Drawing Sheets

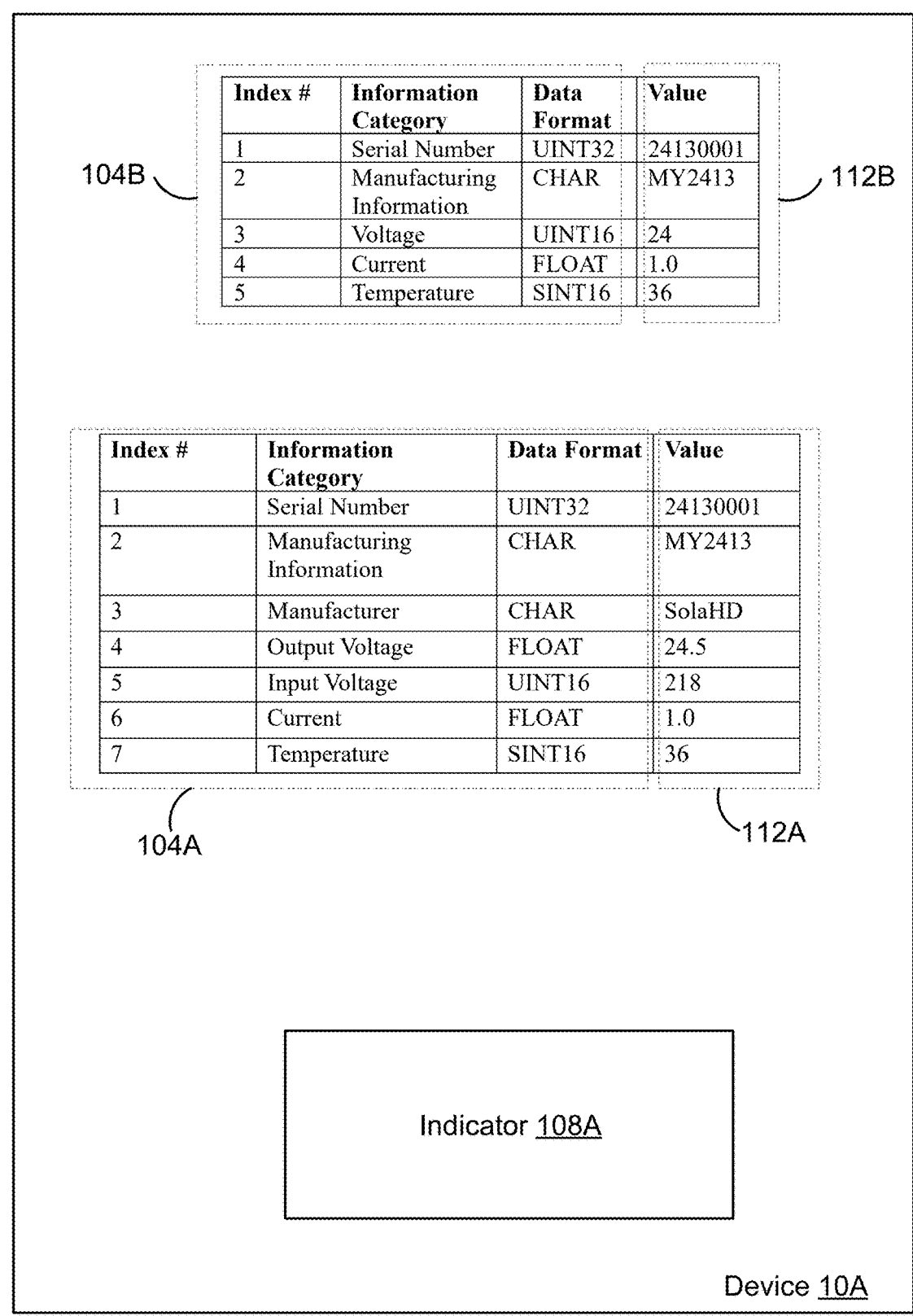

104B

| Index # | Information Category | Data Format | Value |
|---------|---------------------|-------------|-------|
| 1 | Serial Number | UINT32 | 24130001 |
| 2 | Manufacturing Information | CHAR | MY2413 |
| 3 | Voltage | UINT16 | 24 |
| 4 | Current | FLOAT | 1.0 |
| 5 | Temperature | SINT16 | 36 |

112B

| Index # | Information Category | Data Format | Value |
|---------|---------------------|-------------|-------|
| 1 | Serial Number | UINT32 | 24130001 |
| 2 | Manufacturing Information | CHAR | MY2413 |
| 3 | Manufacturer | CHAR | SolaHD |
| 4 | Output Voltage | FLOAT | 24.5 |
| 5 | Input Voltage | UINT16 | 218 |
| 6 | Current | FLOAT | 1.0 |
| 7 | Temperature | SINT16 | 36 |

104A

112A

Indicator 108A

Device 10A

Figure 3

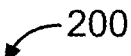

RECEIVING A COMMAND TO USE A FIRST DATASET TO CHARACTERIZE INFORMATION INSTEAD OF A SECOND DATASET, WHEREIN THE FIRST DATASET ASSOCIATES AN INDEX WITH A FIRST INFORMATION CATEGORY AND THE SECOND DATASET ASSOCIATES THE INDEX WITH A SECOND INFORMATION CATEGORY

202

WRITING AN INDICATOR OF THE FIRST DATASET TO A COMPUTER READABLE MEDIUM OF THE FIRST DEVICE IN RESPONSE TO RECEIVING THE COMMAND

204

RECEIVING, FROM A SECOND DEVICE, A REQUEST FOR DATA CORRESPONDING TO THE INDEX

206

RECEIVING, FROM A SECOND DEVICE, A REQUEST FOR DATA CORRESPONDING TO THE INDEX

METHOD AND SYSTEM OF CHANGING DATASET USED TO CHARACTERIZE INFORMATION

FIELD

The present disclosure relates generally to changing an active dataset used for characterizing information, and more specifically to changing an active dataset used by a communication module of an industrial power supply to characterize information related to the power supply.

BACKGROUND

In manufacturing or industrial settings, communication modules are often used to provide an industrial power supply with connectivity to other devices, such as a programmable logic controller (PLC). For example, the PLC can perform various actions or control other devices based on values of the diagnostic information (e.g, temperature, voltage, or current) that is related to the power supply and provided by the communication module. The communication module typically uses a dataset (e.g., a reference table) to associate alphanumeric indices with respective information categories. For instance, the PLC can request the current temperature of the power supply by sending to the communication module an index that corresponds to that temperature. The communication module can retrieve and provide the appropriate information based on the index received from the PLC.

SUMMARY

A first example is a first device comprising a processor and a computer readable medium storing instructions that, when executed by the processor, cause the first device to perform functions. The functions include receiving a command to use a first dataset to characterize information instead of a second dataset. The first dataset associates an index with a first information category and the second dataset associates the index with a second information category. The functions further include writing an indicator of the first dataset to the computer readable medium in response to receiving the command, and receiving, from a second device, a request for data corresponding to the index. The functions further include sending, to the second device, the data that corresponds to the index according to the first dataset.

A second example is a non-transitory computer readable medium storing instructions that, when executed by a first device, cause the first device to perform functions. The functions include receiving a command to use a first dataset to characterize information instead of a second dataset. The first dataset associates an index with a first information category and the second dataset associates the index with a second information category. The functions further include writing an indicator of the first dataset to the non-transitory computer readable medium in response to receiving the command, and receiving, from a second device, a request for data corresponding to the index. The functions further include sending, to the second device, the data that corresponds to the index according to the first dataset.

A third example is a method performed by a first device, the method comprising receiving a command to use a first dataset to characterize information instead of a second dataset. The first dataset associates an index with a first information category and the second dataset associates the index with a second information category. The method further includes writing an indicator of the first dataset to a computer readable medium of the first device in response to receiving the command, and receiving, from a second device, a request for data corresponding to the index. The functions further include sending, to the second device, the data that corresponds to the index according to the first dataset.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 3 is a schematic diagram of a device, according to an example.

FIG. 5 is a block diagram of a method, according to an example.

DETAILED DESCRIPTION

Figure 1:
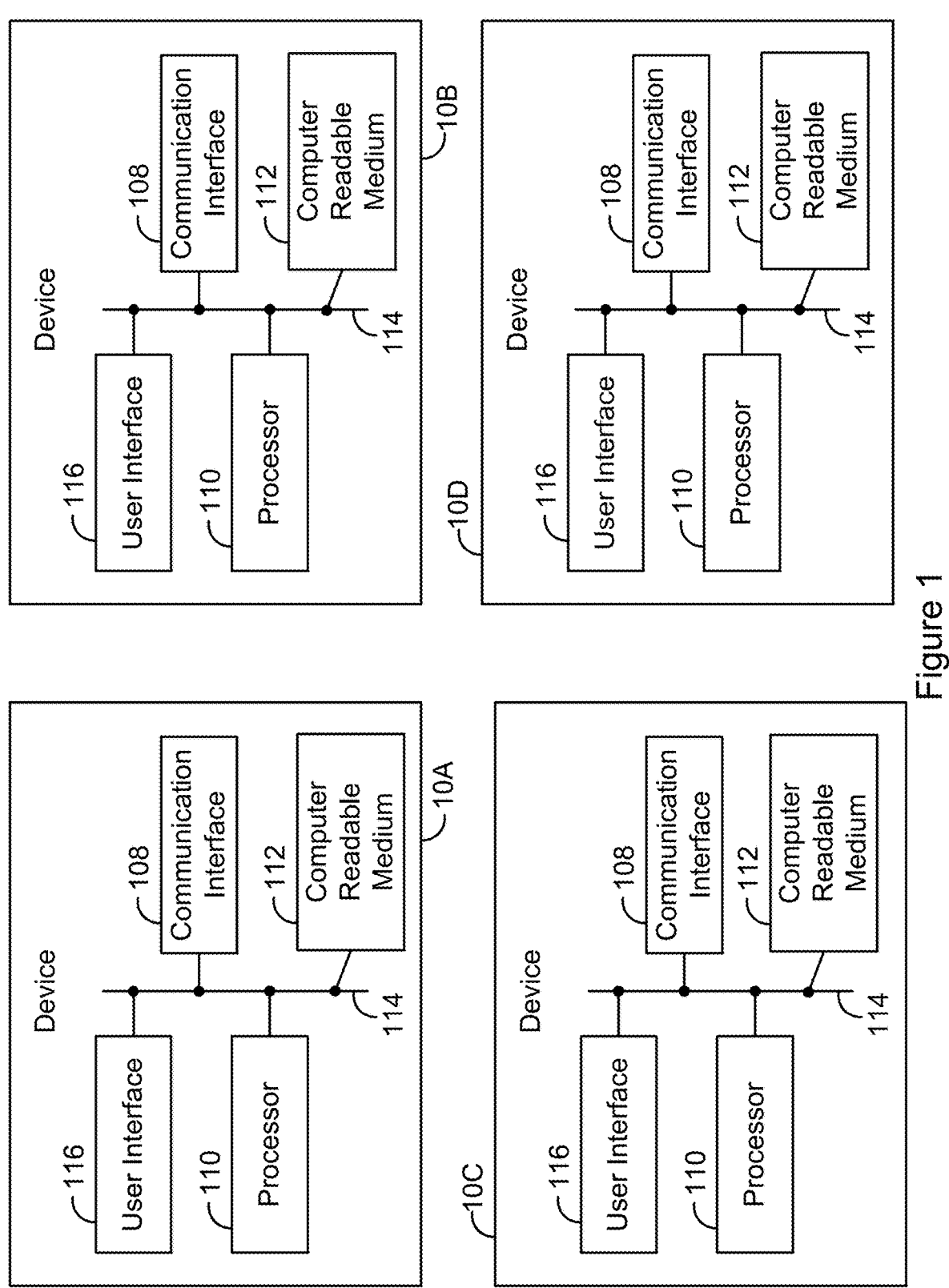
FIG. 1 is a block diagram of four devices, according to an example.

A need exists for communication modules that are adaptable to communicate correctly with many different models of devices. For example, a newly released communication module may need to communicate with a PLC running an older program in a particular factory setting. The new communication module might be configured to use a new dataset that accommodates communication of an expanded set of information categories related to the power supply, whereas the PLC might use an old dataset that does not accommodate some of the information categories included in the new dataset. Worse yet, the dataset used by the PLC and the dataset used by the communication module might assign the same index to different information categories. Thus, the PLC can provide to the communication module a request for information that includes an index and the communication module will misinterpret the request and provide information that pertains to the index according to the dataset of the communication module, not the dataset of the PLC. For example, the communication module might provide a date the power supply was manufactured instead of the input voltage being received by the power supply, as requested by the PLC.

Accordingly, this disclosure includes devices and methods that help address this problem. For example, a first device includes a processor, and a computer readable medium storing instructions that, when executed by the processor, cause the first device to perform functions. In some examples, the first device can take the form of a communication module (e.g., an ethernet adapter) that provides network connectivity for a device such as an industrial power supply.

The functions include receiving a command to use a first dataset to characterize information instead of a second dataset. For example, the communication module receives a command from a desktop computer, a tablet computer, or a smartphone to use an older dataset that is loaded on the communication module instead of a newer expanded dataset that is loaded on the communication module. The purpose of this may be to accommodate communication with a PLC running an older program. The first dataset associates an alphanumeric index with a first information category and the second dataset associates the index with a second information category. For example, the first dataset could associate the index "1" with a temperature of the power supply and the second dataset could associate the index "1" with an input voltage of the power supply. The functions further include writing an indicator of the first dataset to the computer readable medium in response to receiving the command. For instance, the communication module writes the letter "A" as an indicator of the older dataset to a memory location that is known to store the indicator of the currently active dataset. The functions further include receiving, from the PLC for example, a request for data corresponding to the index. Often, the request will include the index, but in some cases like a Modbus TCP protocol, the request will include a register address. The functions further include sending, to the second device (e.g., the PLC), the data that corresponds to the index according to the first dataset.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

FIG. 1 is a block diagram of a device 10A, a device 10B, a device 10C, and a device 10D with which aspects of the present disclosure can be implemented. Each of the devices 10 include a communication interface 108, one or more processors 110, a computer readable medium 112, and a user interface 116. The user interface 116, the communication interface 108, the processor 110, and the computer readable medium 112 can be linked with each other via a system bus, network, or other connection mechanism 114.

The communication interface 108 may take a variety of forms and is configured to allow the devices 10 to communicate with one or more other devices (e.g., other devices 10) according to any number of protocols. In some examples, the communication interface 108 may take the form of a wired interface, such as an Ethernet interface. Additionally or alternatively, the communication interface 108 may take the form of a wireless interface, such as a cellular interface, a Bluetooth interface, or a Wi-Fi interface.

The processor 110 may include a general purpose processor (e.g., a microprocessor or a microcontroller) and/or a special purpose processor (e.g., a digital signal processor (DSP)).

The computer readable medium 112 may include one or more volatile, non-volatile, removable, and/or non-removable storage components, such as magnetic, optical, or flash storage, and may be integrated in whole or in part with the processor 110. Further, the computer readable medium 112 may have stored thereon program instructions (e.g., compiled or non-compiled program logic and/or machine code) that, when executed by the processor 110, cause the device 10 to perform one or more functions, such as those described in this disclosure. In some examples, the computer readable medium 112 includes an electrically erasable programmable read-only memory (EEPROM), a non-volatile memory, and a random access memory (RAM).

The user interface 116 is configured for facilitating interaction between the device 10 and a user of the device 10, such as by receiving input from the user and providing output to the user. Thus, the user interface 116 may include input components such as a keyboard, a touchscreen, or push buttons. In addition, the user interface 116 may include output components such as a display screen, a sound speaker, or other audio output mechanism.

Figure 2:
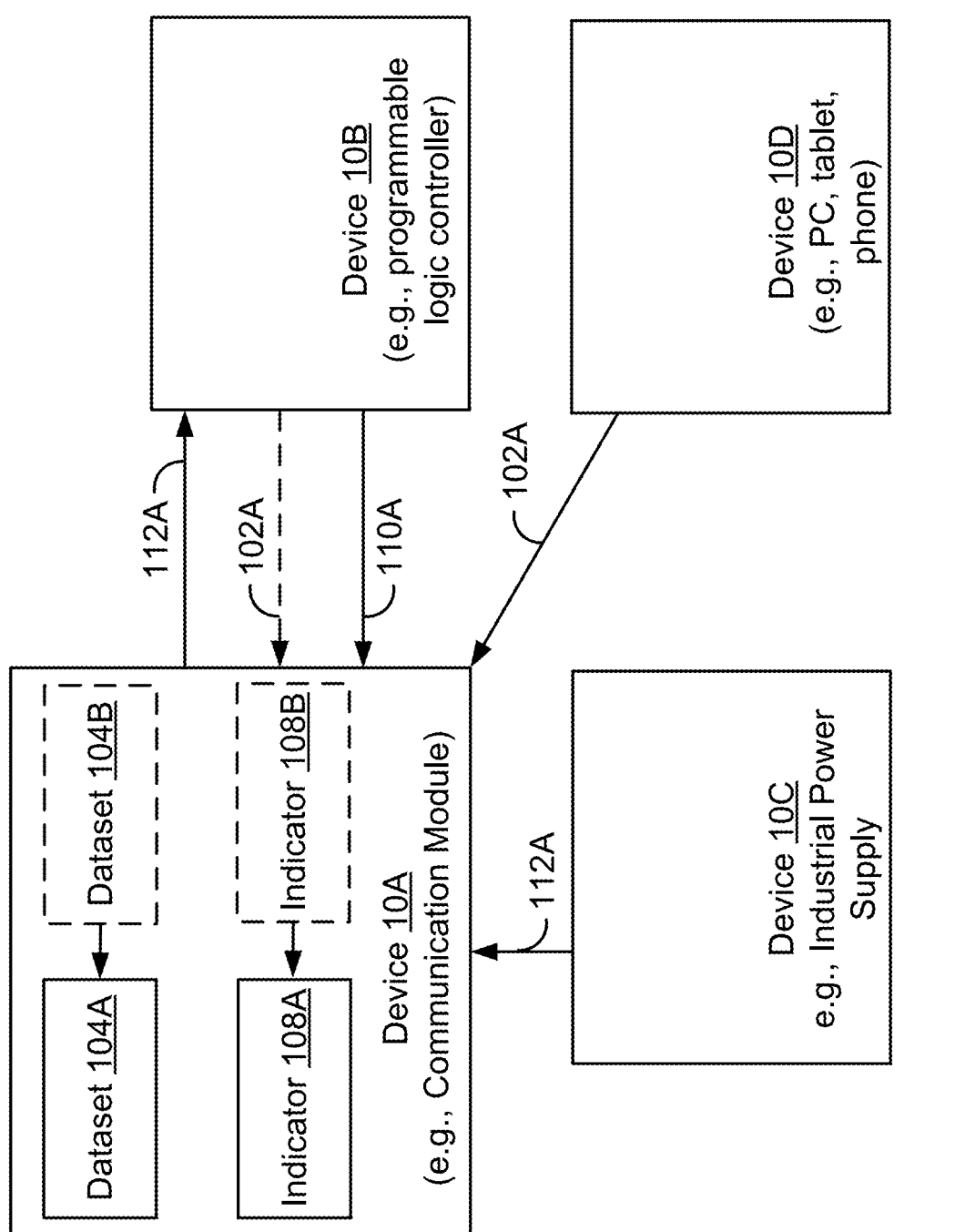
FIG. 2 is a schematic diagram of operations of four devices, according to an example.

FIG. 2 is a schematic diagram of operations of the device 10A, the device 10B, the device 10C, and the device 10D. In some examples, the device 10A takes the form of a communication module, i.e., an ethernet adapter configured to provide network connectivity for the device 10C via (1) a serial connection between the device 10A and the device 10C and (2) a network connection between the device 10A and the device 10B and/or the device 10D. For instance, the device 10A takes the form of a Sola HD SCM-E-EIP. In some examples, the device 10A is an ethernet adapter that is fully integrated with the device 10C.

The device 10B can take the form of a PLC and/or a human machine interface (HMI). Other examples are possible.

The device 10C can take the form of an industrial power supply or a UPS system. For instance, the device 10C can take the form of a SolaHD SDN10 24 100D, SDN20 24 100D, or SDN40 24 100D power supply or a SolaHD uninterruptible power supply system SDU10 24B or SDU20 24B.

In some examples, the device 10D is a smartphone, a tablet computer, a handheld device configurator, a laptop computer, or a desktop computer.

In operation, the device 10A receives a command 102A to use a dataset 104A to characterize information instead of a dataset 104B. In various examples, the device 10A receives the command 102A from the device 10D or from the device 10B. For example, the device 10A provides a webserver interface that is accessible using the device 10B or the device 10D, and the command is received via the webserver interface. In other examples, the device 10A receives the command 102A from the user interface 116 of the device 10A.

The dataset 104A associates an alphanumeric index with a first information category and the second dataset associates the same index with a second information category. This is described in more detail with reference to FIG. 3 below.

Next, the device 10A writes an indicator 108A of the dataset 104A to the computer readable medium 112 of the device 10A in response to receiving the command 102A. In some examples this involves the device 10A writing the indicator 108A over an indicator 108B of the dataset 104B, that is, writing the indicator 108A at the memory location of the indicator 108B thereby erasing the indicator 108B. Typically, the indicator 108A is written onto an EEPROM of the computer readable medium 112 of the device 10A.

Generally, the device 10A reboots or restarts after the indicator 108A is written onto the computer readable medium 112 of the device 10A. The device 10C can operate normally during the reboot of the device 10A, although the device 10C will not be in communication with the device 10B or the device 10D during the reboot of the device 10A.

After the reboot of the device 10A, the device 10A receives, from the device 10B, a request 110A for data 112A corresponding to the index mentioned above. For example, the request 110A could include the index. In response to receiving the request 110A, the device 10A reads the indicator 108A at the memory location known to store the indicator of the active dataset 104 and then reads the dataset 104A at a location corresponding to the indicator 108A. That is, the indicator 108A could be an alphanumeric memory address at which the dataset 104A is stored. After reading the dataset 104A, the device 10A selects the data 112A that corresponds to the index according to the dataset 104A for sending to devices such as the device 10B. The data 112A is received by the device 10A from the device 10C. The data 112A characterizes the device 10C. Finally, the device 10A sends, to the device 10B, the data 112A that corresponds to the index according to the dataset 104A.

FIG. 3 is a schematic diagram of the device 10A. The device 10A stores the dataset 104A as well as the dataset 104B. As shown, the dataset 104B is an older, smaller dataset corresponding to older devices and the dataset 104A is a newer, expanded dataset that accommodates additional information categories for communication with newer devices.

The data 112A and data 112B include some of the same information, but various data items are indexed differently by the dataset 104A when compared to the dataset 104B. For example, the dataset 104A characterizes the value 24.5 as an output voltage corresponding to the index 4, whereas the dataset 104B characterizes the value 24 as a voltage corresponding to the index 3. Along these lines, the dataset 104A associates the index 3 with a manufacturer of the device 10C whereas the dataset 104B associates the index 3 with a voltage of the device 10C. Also, the dataset 104A associates the index 3 with a data format of CHAR whereas the dataset 104B associates the index 3 with a data format of UINT16. Thus, when the device 10A sends data corresponding to the index 3 to the device 10B using the dataset 104A as a guide, the data 112A is sent in the data format CHAR and includes the manufacturer SolaHD. When the device 10A sends data 112B corresponding to the index 3 to the device 10B using the dataset 104B as a guide, the data 112B is sent in the data format UINT16 and includes the voltage 24.

In various examples, the data 112A and the data 112B can each include one or more of a voltage generated by the device 10C, a current generated by the device 10C, a temperature of the device 10C, a serial number of the device 10C, a model version of the device 10C, a firmware version of the device 10C, or manufacturing information associated with the device 10C.

Figure 4:
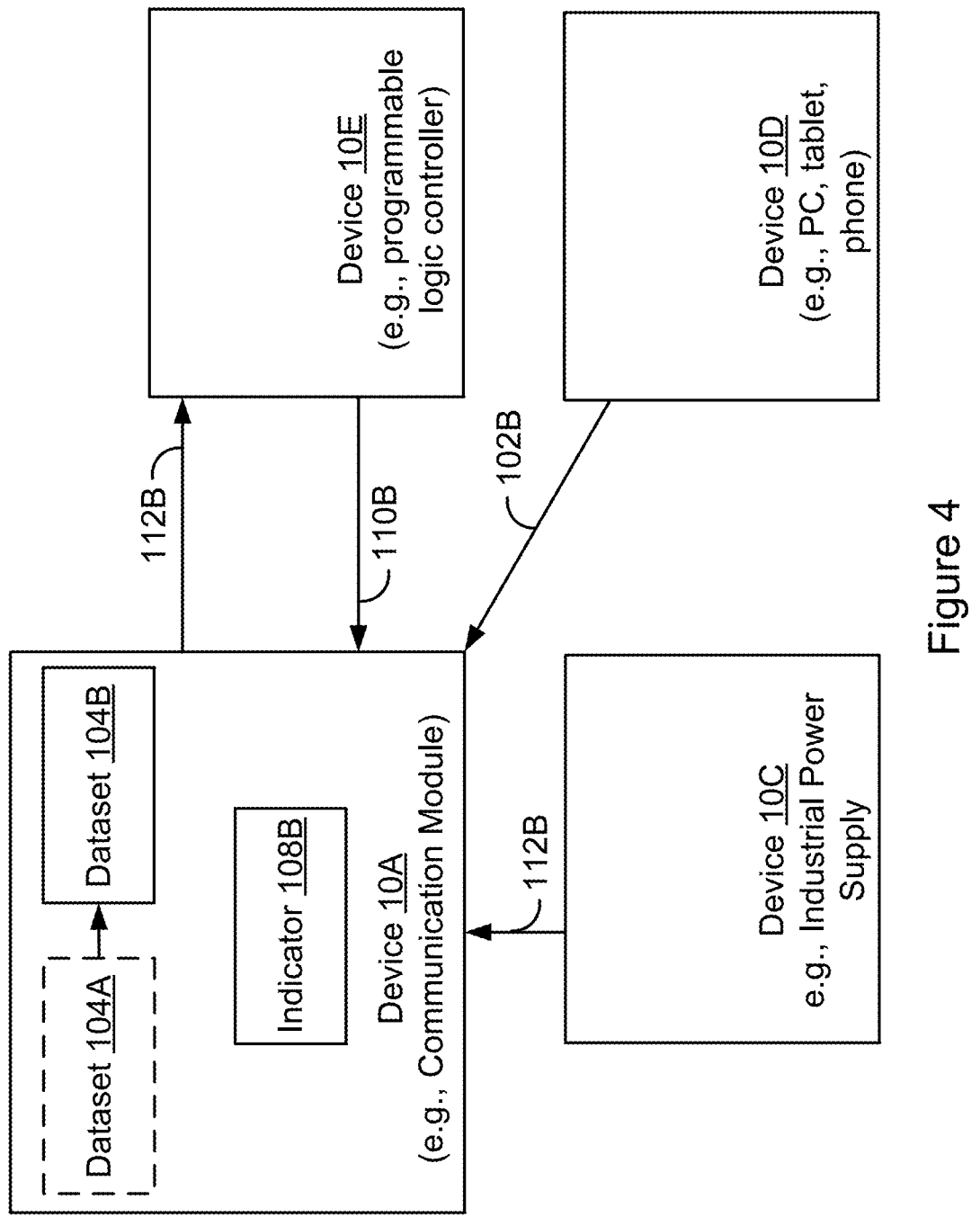
FIG. 4 is a schematic diagram of operations of four devices, according to an example.

FIG. 4 is a schematic diagram of operations of the device 10A, the device 10B, the device 10C, and the device 10D. In FIG. 4, the device 10A is configured to use the older dataset 104B.

The device 10A receives a command 102B to use the dataset 104B to characterize information instead of the dataset 104A. The device 10A writes the indicator 108B of the dataset 104B to the computer readable medium of the device 10A in response to receiving the command 102B from the device 10D. Next, the device 10A receives from a device 10E, a request 110B for data 112B corresponding to the index according to the dataset 104B. Finally, the device 10A sends, to the device 10E, the data 112B that corresponds to the index according to the dataset 104B.

FIG. 5 is a block diagram of a method 200, which in some examples are performed by the device 10A. As shown in FIG. 5, the method 200 includes one or more operations, functions, or actions as illustrated by blocks 202, 204, 206, and 208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 202, the method 200 includes receiving the command 102A to use the dataset 104A to characterize information instead of the dataset 104B. The dataset 104A associates an index with a first information category and the dataset 104B associates the index with a second information category. Functionality related to block 202 is discussed above with reference to FIG. 2 and FIG. 3.

At block 204, the method 200 includes writing the indicator 108A of the dataset 104A to the computer readable medium 112 of the device 10A in response to receiving the command 102A. Functionality related to block 204 is discussed above with reference to FIG. 2 and FIG. 3.

At block 206, the method 200 includes receiving, from the device 10B, the request 110A for data corresponding to the index. Functionality related to block 206 is discussed above with reference to FIG. 2 and FIG. 3.

At block 208, the method 200 includes sending, to the device 10B, the data 112A that corresponds to the index according to the dataset 104A. Functionality related to block 208 is discussed above with reference to FIG. 2 and FIG. 3.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A first device comprising:
   a processor; and
   a non-transitory computer readable medium storing instructions that, when executed by the processor, cause the first device to perform functions comprising:
   receiving a command to use a first dataset to characterize information instead of a second dataset, wherein the first dataset associates an index with a first information category and the second dataset associates the index with a second information category;
   writing an indicator of the first dataset to the non-transitory computer readable medium in response to receiving the command;
   receiving, from a second device, a request for data corresponding to the index; and
   sending, to the second device, the data that corresponds to the index according to the first dataset, wherein the first device is configured to provide network connectivity for a third device comprising an industrial power supply or an uninterruptible power supply (UPS) system.

2. The first device of claim 1, the functions further comprising rebooting the first device prior to receiving the request and while the third device continues to operate.

3. The first device of claim 1, the functions further comprising receiving the data from the third device prior to sending the data to the second device, wherein the data characterizes the third device.

4. The first device of claim 1, wherein the data comprises a voltage generated by the third device, a current generated by the third device, a temperature of the third device, a serial number of the third device, a model version of the third device, a firmware version of the third device, or manufacturing information associated with the third device.

5. The first device of claim 1, the functions further comprising, prior to sending the data:

reading the first dataset on the non-transitory computer readable medium; and selecting the data that corresponds to the index according to the first dataset for sending to the second device.

6. The first device of claim 1, the functions further comprising reading the indicator of the first dataset on the non-transitory computer readable medium, wherein reading the first dataset on the non-transitory computer readable medium comprises reading the first dataset at a location corresponding to the indicator.

7. The first device of claim 1, wherein the second device is a programmable logic controller.

8. The first device of claim 1, wherein receiving the command comprises receiving the command from a user interface of the first device.

9. The first device of claim 1, wherein receiving the command comprises receiving the command from the second device via a webserver interface.

10. The first device of claim 1, wherein receiving the command comprises receiving the command from a fourth device via a webserver interface.

11. The first device of claim 1, wherein the index corresponds to a memory location on the non-transitory computer readable medium.

12. The first device of claim 1, wherein writing the indicator of the first dataset comprises writing the indicator of the first dataset over a second indicator of the second dataset.

13. The first device of claim 1, further comprising:

receiving a second command to use the second dataset to characterize the information instead of the first dataset;

writing a second indicator of the second dataset to the non-transitory computer readable medium in response to receiving the second command;

receiving, from a fourth device, a second request for data corresponding to the index; and sending, to the third device or the fourth device, the data that corresponds to the index according to the second dataset.

14. The first device of claim 1, wherein the first dataset associates the index with a first data format and the second dataset associates the index with a second data format.

15. The first device of claim 14, wherein sending the data comprises sending the data such that the data conforms to the first data format.

16. The first device of claim 1, wherein writing the indicator of the first dataset comprises writing the indicator of the first dataset into an electrically erasable programmable read-only memory of the first device.

17. A non-transitory computer readable medium storing instructions that, when executed by a first device, cause the first device to perform functions comprising:

receiving a command to use a first dataset to characterize information instead of a second dataset, wherein the first dataset associates an index with a first information category and the second dataset associates the index with a second information category;

writing an indicator of the first dataset to the non-transitory computer readable medium in response to receiving the command;

receiving, from a second device, a request for data corresponding to the index; and sending, to the second device, the data that corresponds to the index according to the first dataset, wherein the first device is configured to provide network connectivity for a third device comprising an industrial power supply or an uninterruptible power supply (UPS) system.

18. A method performed by a first device, the method comprising:

receiving a command to use a first dataset to characterize information instead of a second dataset, wherein the first dataset associates an index with a first information category and the second dataset associates the index with a second information category;

writing an indicator of the first dataset to a non-transitory computer readable medium of the first device in response to receiving the command;

receiving, from a second device, a request for data corresponding to the index; and sending, to the second device, the data that corresponds to the index according to the first dataset, wherein the first device is configured to provide network connectivity for a third device comprising an industrial power supply or an uninterruptible power supply (UPS) system.

19. The method of claim 18, further comprising rebooting the first device prior to receiving the request and while the third device continues to operate.

20. The method of claim 18, further comprising receiving the data from the third device prior to sending the data to the second device, wherein the data characterizes the third device.

* * * * *